Dec. 26, 1967   J. S. ECKERT   3,360,246
DISTRIBUTOR WITH BED-LEVEL LIMITER
Filed Feb. 25, 1966   3 Sheets-Sheet 1

INVENTOR.
JOHN S. ECKERT
BY
ATTORNEY

Dec. 26, 1967     J. S. ECKERT     3,360,246
DISTRIBUTOR WITH BED-LEVEL LIMITER
Filed Feb. 25, 1966     3 Sheets-Sheet 2

INVENTOR.
JOHN S. ECKERT
BY
ATTORNEY

Dec. 26, 1967     J. S. ECKERT     3,360,246
DISTRIBUTOR WITH BED-LEVEL LIMITER
Filed Feb. 25, 1966     3 Sheets-Sheet 3

INVENTOR.
JOHN S. ECKERT
BY
ATTORNEY

United States Patent Office 3,360,246
Patented Dec. 26, 1967

3,360,246
DISTRIBUTOR WITH BED-LEVEL LIMITER
John S. Eckert, Silver Lake, Ohio, assignor, by mesne assignments, to U.S. Stoneware, Inc., a corporation of Massachusetts
Filed Feb. 25, 1966, Ser. No. 530,153
8 Claims. (Cl. 261—98)

ABSTRACT OF THE DISCLOSURE

In a tower equipped with a distributor and provided with a bed of packing elements under the distributor, a porous undulating limiter is provided which limits the possible upward displacement of the elements when the bed is expanded during cleaning or during a transient overload.

The invention relates to a distributor for a chemical tower which contains a bed of generally static packing elements, with means between the arms of the distributor to limit the height to which the packing elements may rise in the tower and thus prevent them from becoming displaced into the distributor, as when the bed is expanded during cleaning or during a transient overload.

The bed-level limiter of this invention is characterized by the fact that it is wavy, i.e. undulated, with sharp or rounded edges. Thus, a large surface of the bed, when expanded to fill the limiter, is exposed for the release of gas passing through the bed and the reception of liquid entering the bed. The limiter may be continuous across the entire area of the tower, or it may be divided into units which individually span the distance between each two arms of a distributor.

The distributor is of any type which includes arms extending outwardly from a supply source for the liquid fed to the tower, and the invention has particular value in connection with a distributor having trough-type arms into which packing elements may fall when the bed is expanded. The limiter is screen-like and is preferably formed from expanded metal, and regardless of whether the distributor arms are open or closed, its waves are at least as high as the vertical thickness of the ditstributor arms. The crests of the waves need not be parallel to the arms of the distributor, but if they are, that portion of the limiter located between each two arms generally constitutes at least one wave. Thus the area of the exposed top surface of the bed is immensely increased for the escape of gases and, at the same time, for entry of the liquid into the bed.

The limiter is advantageously demountably located so that it can be readily disassembled from the distributor if the occasion demands it, and this design is particularly adapted for use with a distributor in which the arms are troughs—open at their tops. Alternatively, the limiter may be fastened to the distributor for introduction into the tower with the distributor and for removal from the tower with it. The limiter need not be connected with the distributor, but may be entirely separate from it.

The invention is further described in connection with the accompanying drawings, in which—

Figure 1:
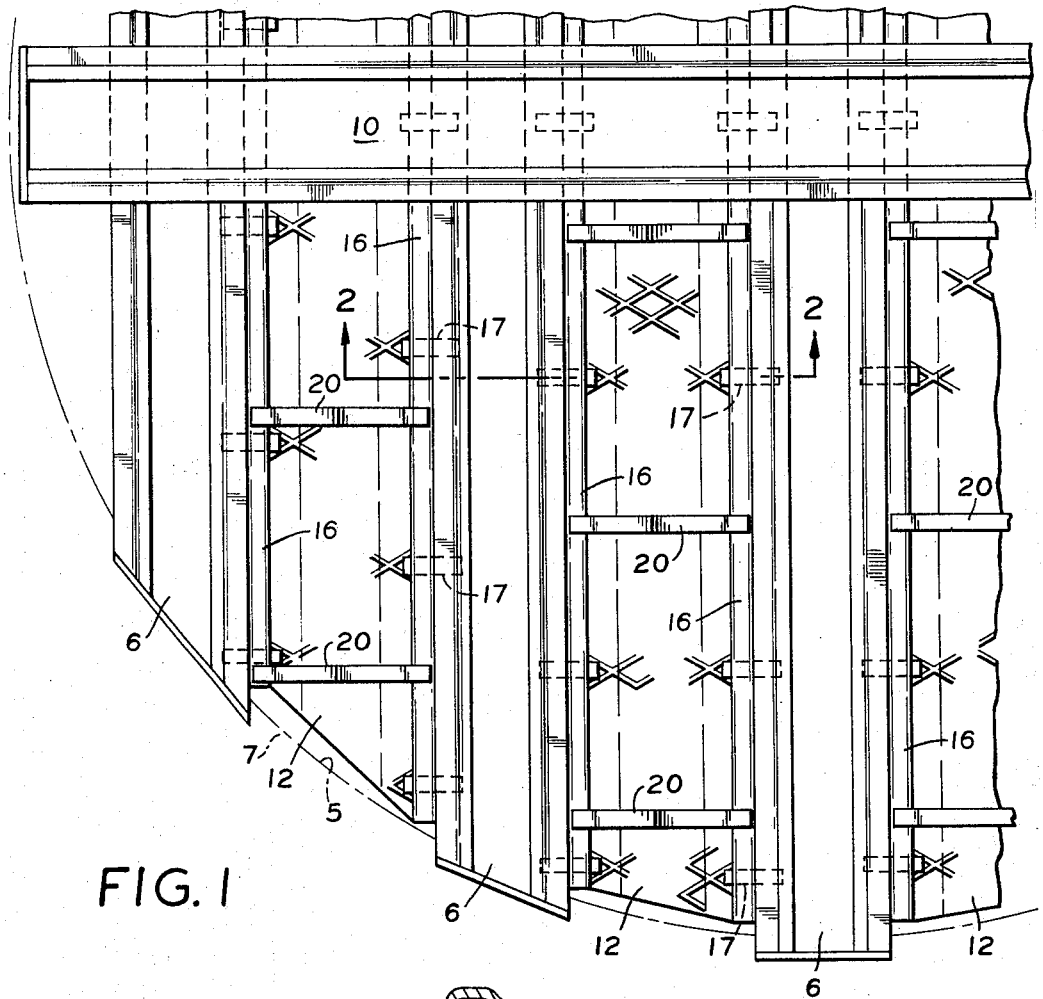
FIGURE 1 is a plan view of a portion of a distributor in a tower with a limiter between the distributor arms which are trough type.
Figure 4:
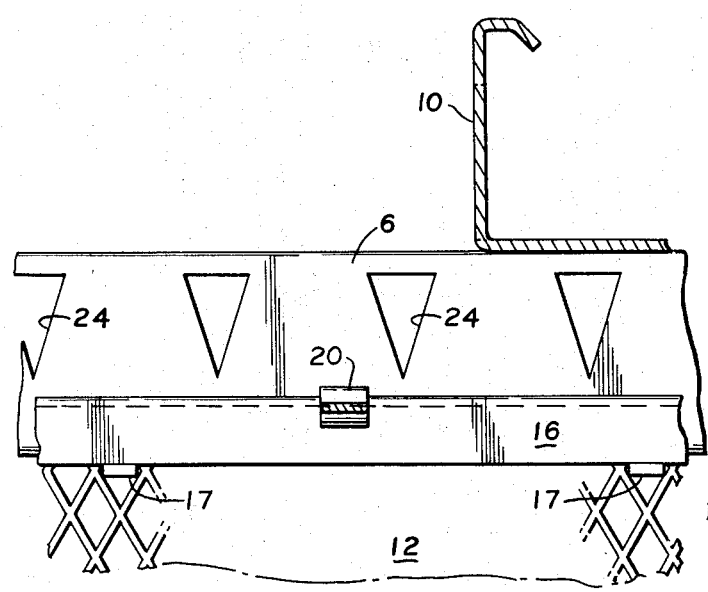
FIGURE 4 is a view of the distributor and limiter at a right angle to the view shown in FIGURE 2.
Figure 2:
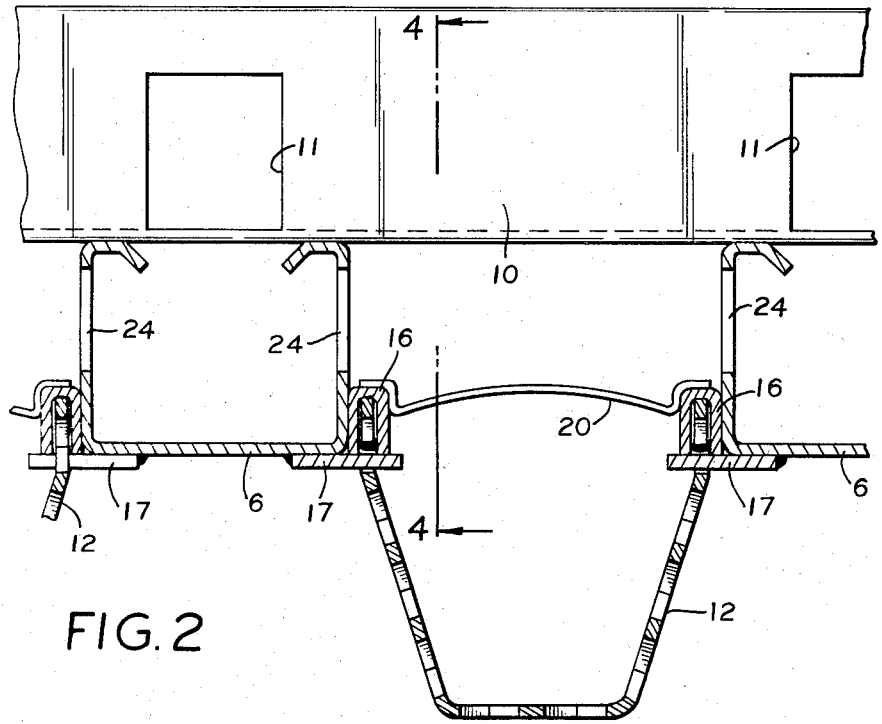
FIGURE 2 is a section of the same on an enlarged scale, on line 2—2 of FIGURE 1.
Figure 3:
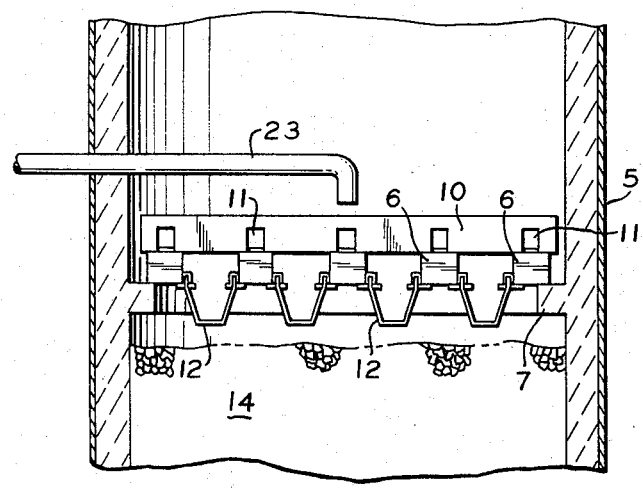
FIGURE 3 is a section on a much smaller scale, through a tower containing a bed of packing elements and the distributor and limiter of FIGURE 1.

In the tower 5, the troughs 6 are supported on a ledge 7 (FIGURE 3) in the tower, and the parting box 10 with openings 11 is supported on the troughs and welded thereto. The limiters 12 are also supported by the troughs. The bed 14 of packing elements is suitably supported by means which is not shown.

The limiters 12, made of expanded metal, are wavy, being generally V-shaped, but with flat btooms. Their opposite edges are covered by U-channels 16 or flat bar stock or the like and are welded to these. Supports 17 welded to the bottoms of the troughs enter openings in the expanded metal, and support the U-channels. The leaf spring spacers 20 are sprung against the U-channels and maintain them in position on the supports. When necessary, the limiters are easily removed by lifting the springs, sliding the U-channels off of the supports, and then lifting the limiters without dislocating the distributor.

Liquid supplied through any suitable means such as the pipe 23 (FIGURE 3), flows into parting box 10, and thence through openings 11 into troughs 6 and through weir openings 24 into the limiters and thence down over the packing elements in the bed. There may be additional openings in the bottoms of the troughs.

It is sometimes advisable with beds of packing elements made of metal or plastic, to expand the bed from time to time to clean fouling materials from it. This is not usually done with beds of ceramic elements, but it may be done. Also, such a bed may be expanded from time to time by overloading. In the absence of the limiters, the top of the expanding bed may rise to the level of the bottoms of the troughs in which event the exposed surface area is greatly reduced, and packing elements may even rise between the troughs to the tops of the troughs and fall into them. The limiters prevent this. They limit the amount the bed will rise and because of their wavy construction they provide a large exposed area at the top of the bed for the escape of gases rising through the bed, and for the liquid supplied to the bed; they even provide troughs for the accumulation of excess liquid. When the operation returns to normal the bed returns to its previous height, such as that indicated in FIGURE 3.

The springs 20 may be replaced by toggle means or a brace of invariable length, or the U-channels may be welded to the troughs. As a further alternative, if no upthrust is contemplated, the U-channels may rest on hooked supports.

Figure 5:
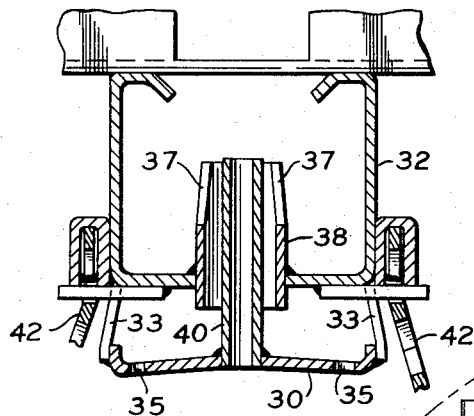
FIGURE 5 is a detail section through a distributor arm of different construction with a limiter fastened thereto.

Instead of draining liquid through openings located in the sides and/or bottoms of the troughs, a pan 30 may be provided under the troughs, as illustrated in FIGURE 5. This pan is supported from the trough 32 by narrow straps 33. It extends the whole length of the trough, and its ends are turned up at least to the height that its sides are turned up. There are small perforations 35 scattered throughout its length. Liquid collects in the trough, and overflows through weir openings 37 in the risers 38. Gas rises through the pipes 40. The liquid is collected in the pan and flows on the bed through the perforations 35, and if the amount is large it overflows the side walls, giving relatively uniform distribution of the liquid regardless of whether its amount is small or large. The limiters 42 are constructed and supported as previously explained.

Figure 6:
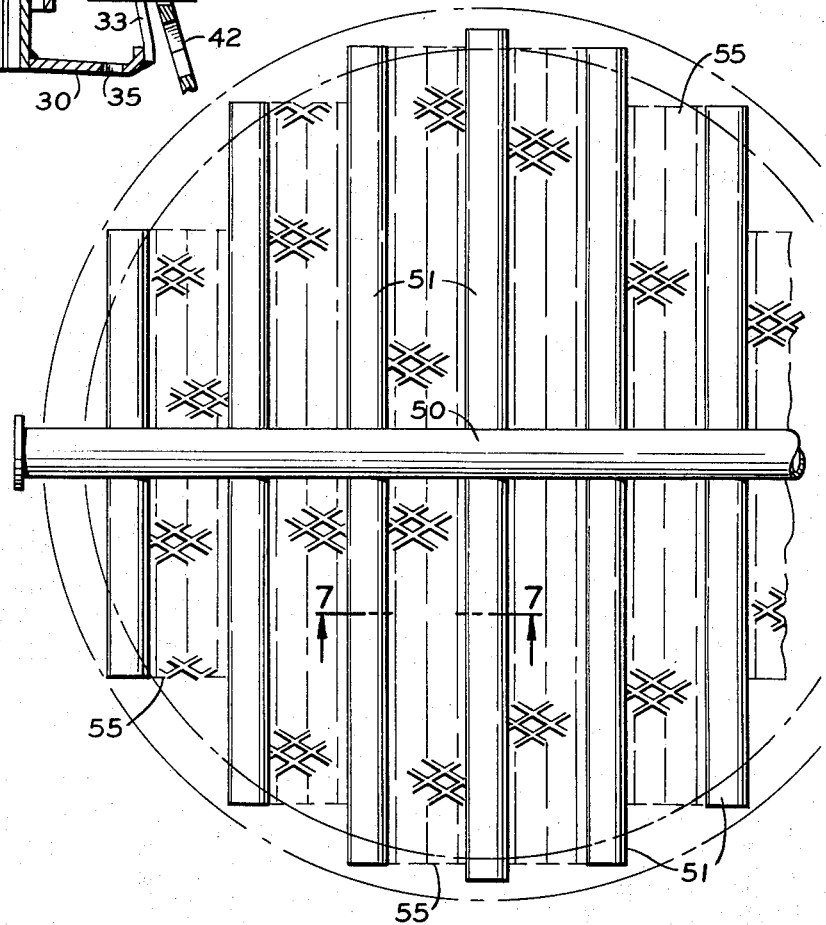
FIGURE 6 is a plan view of a tower equipped with a different type of distributor with a limiter.
Figure 7:
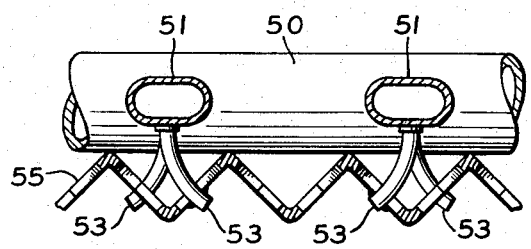
FIGURE 7 is a cross section, on the line 7—7 of FIGURE 6.

A different type of distributor is illustrated in FIGURES 6 and 7. The header 50 is closed, and the liquid is introduced into it, usually at one or both ends, through means not shown. Closed branches or arms 51 extend from both sides of it. The liquid escapes into the bed through nipples or velocity-retarder tubes 53. The limiter 55, made of expanded metal, is welded to the nipples. A single limiter covers the entire tower area. It is welded to the distributor and is placed in the tower and removed from it as a unit with the distributor. The limiter is wavy, so that as the bed rises into contact with it there is a larger surface of the bed exposed for the release of gas and introduction of liquid than if the limiter were flat.

The invention is covered in the claims which follow.

What I claim is:

1. A tower including a bed of normally static packing elements suitably supported therein; a distributor supported in said tower and above said bed, comprising a plurality of conduits spaced from each other by a distance large enough to permit the passage of packing elements; and a plurality of foraminous limiter members, of undulant cross-section, each supported by adjacent conduits and bridging the space therebetween, whereby upon temporary expansion of said bed, said packing elements are contained by the combined surface provided by said conduits and said limiter members.

2. The tower as defined in claim 1 wherein said conduits are provided with a plurality of outlets communicating directly with said bed of packing elements.

3. The tower of claim 1 in which said limiter members are removably supported by said conduits.

4. A tower including a bed of normally static packing elements suitably supported therein; a distributor supported in said tower and above said bed, comprising a plurality of conduits spaced from each other by a distance large enough to permit the passage of packing elements; a plurality of outlet tubes communicating with and depending from said conduits; and foraminous limiter means of undulant cross-section, operative to contain said packing elements upon temporary expansion of said bed, secured to said plurality of outlet tubes.

5. A distributor assembly for a mass transfer tower comprising a plurality of spaced conduits; and a plurality of foraminous limiter members of undulant cross-section each supported by adjacent conduits and bridging the space therebetween.

6. The combination of claim 5 in which said limiter members are removably supported by said conduits.

7. The combination of claim 5 in which each of the respective edges of said limiter members is slidably supported by outwardly directed projections on said conduits and spring means press the opposite edges of said limiter members toward the adjacent conduits by which they are respectively supported.

8. A distributor assembly for a mass transfer tower comprising a plurality of spaced conduits; a plurality of outlet tubes communicating with and depending from said conduits; and foraminous limiter means of undulant cross-section secured to said plurality of outlet tubes.

References Cited

UNITED STATES PATENTS

| 1,475,243 | 11/1923 | Piron | 261—98 |
| 1,578,687 | 3/1926 | Sperr | 261—95 |
| 3,016,234 | 1/1962 | Huppmeier | 261—98 |
| 3,219,324 | 11/1965 | Williams et al. | 261—95 |
| 3,259,380 | 7/1966 | Brown | 261—97 |

FOREIGN PATENTS

| 646,455 | 8/1962 | Canada. |

OTHER REFERENCES

"Support Plates, Distributors and Hold-Down Plates," Design Manual TA–4OR of the U.S. Stoneware Co., Akron 9, Ohio, Cpr. 1960.

HARRY B. THORNTON, *Primary Examiner.*

TIM R. MILES, *Assistant Examiner.*